A. C. BUTTMAN & F. P. GABLE.
SAW ATTACHMENT.
APPLICATION FILED NOV. 1, 1915.
1,226,464.
Patented May 15, 1917.
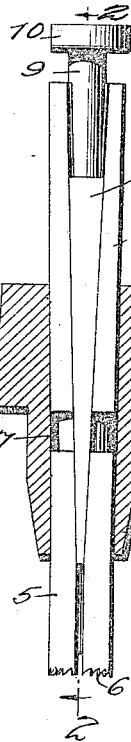
Fig. 1.
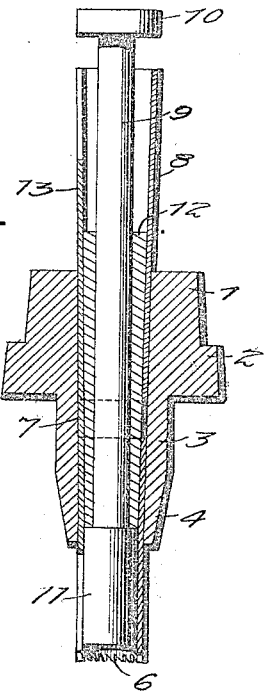
Fig. 2.
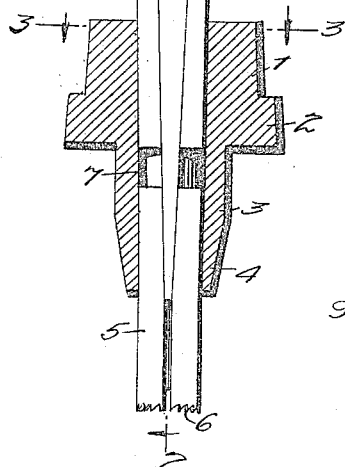
Fig. 3.
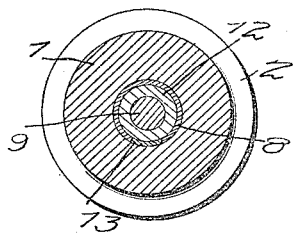
Fig. 4.
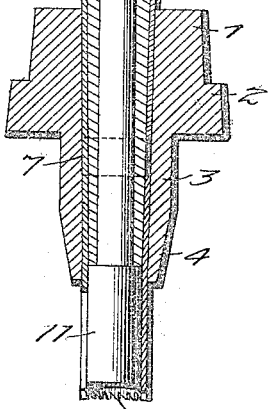
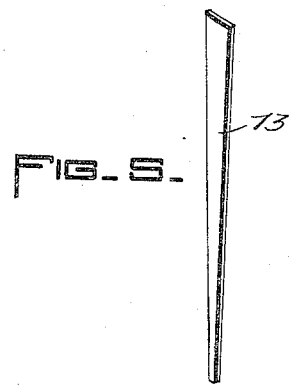
Fig. 5.   Fig. 6.   Fig. 7.
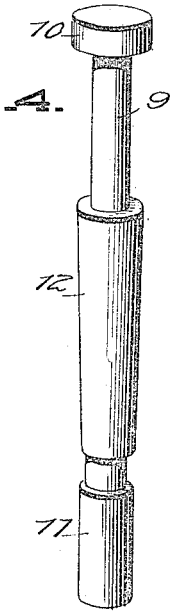
WITNESSES:
J. V. Phillips
C. E. Trainor
INVENTORS
ALONZO C. BUTTMAN,
FRANK P. GABLE
BY Munn & Co.
ATTORNEYS

UNITED STATES PATENT OFFICE.

ALONZO C. BUTTMAN AND FRANK P. GABLE, OF GRANDVIEW, IOWA; SAID BUTTMAN ASSIGNOR TO SAID GABLE.

SAW ATTACHMENT.

1,226,464. Specification of Letters Patent. Patented May 15, 1917.

Application filed November 1, 1915. Serial No. 59,142.

*To all whom it may concern:*

Be it known that we, ALONZO C. BUTTMAN and FRANK P. GABLE, citizens of the United States, and residents of Grandview, in the county of Louisa and State of Iowa, have invented certain new and useful Improvements in Saw Attachments, of which the following is a specification.

Our invention is an improvement in attachments for saws, and the invention has for its object to provide an attachment of the character specified, for use in connection with button saws and the like, for permitting the saw to be tightly keyed in the spindle, regardless of the length of the saw, and for reinforcing the saw adjacent to the teeth, and for permitting the easy removal of the saw, wherein a stem is provided having an enlargement fitting within the saw and engaging within the adjacent end of the spindle, and having a locking sleeve for engaging within the upper end of the saw to key the saw in place.

In the drawings:

Figure 1 is a side view of the saw, spindle and clamping mechanism, with the mounting in section;

Figs. 2 and 3 are sections on lines 2—2 and 3—3 of Fig. 1, each figure looking in the direction of the arrows adjacent to the line;

Fig. 4 is a perspective view of the stem;

Fig. 5 is a similar view of the wedge;

Fig. 6 is a similar view of the clamping sleeve, and

Fig. 7 is a similar view of the saw.

In the present embodiment of the invention a spindle or mounting is provided, consisting of a cylindrical block, composed of portions 1, 2 and 3, of unequal diameter, the portion 2 being of greatest diameter, while the portion 3 is of least diameter, and the portion 2 is interposed between the portions 1 and 3. The lower end of the portion 3 is beveled or inclined, as indicated at 4, and the spindle is provided with a central bore, extending entirely through the portions 1, 2 and 3, and tapering slightly at its upper end and decreasing in cross section from the portion 1 to the portion 3.

The saw 5 is in the form of a split sleeve having teeth 6 at its lower edge, and the sleeve is of such size that when fitted in the bore 7 of the spindle the side edges of the split will be spaced apart from each other, as shown in Fig. 1.

Above the saw a reinforcing sleeve 8 is provided, the said sleeve being similar to the sleeve 5, but of greater length, and having its ends plain, and the sleeve is of such size that when fitted into the upper end of the bore 7 of the spindle, the side edges of the split will be spaced apart from each other.

It will be noted from an inspection of the drawing, that the sleeve 8 is frusto-conical, that is, it is tapered to correspond with the taper of the upper end of the bore 7.

A stem 9 is provided at its upper end with a head 10, and at its lower end with a cylindrical enlargement 11, which is of a size to fit within the saw, and to expand the saw into close contact with the inner wall of the bore 7. The stem is provided between the head 10 and the enlargement 11 with a tapering or frusto-conical sliding locking sleeve 12 of some length, and having a frusto-conical or tapering periphery, the periphery of the sleeve 12 being shaped to fit the interior of the sleeves 5 and 8 and to hold the peripheral surfaces of the said sleeves in close contact with the interior of the bore 7.

A wedge 13 is also provided, of sheet material, and of the same gage as that composing the sleeves 5 and 8, and this wedge is adapted to fit between the side edges of the splits of the saw 5, and the sleeve 8, to hold the side edges of the splits apart and to insure that the peripheral surfaces of the sleeves and of the saw will be in tight contact with the interior of the bore 7.

In use, the saw is inserted as shown in the drawing, after which the sleeve 8 is inserted, and the wedge 13 is arranged as shown in Fig. 1, the said wedge engaging at its small end the split of the sleeve 5 and at its large end the split of the sleeve 8, and the wedge is of such length and of such proportions that when in this position its lower end will be spaced from the teeth 6 of the saw, and its upper end will be spaced from the upper end of the sleeve 8.

The sleeve and the saw are thus held expanded, and the stem is inserted, until the lower end of the enlargement 11 is just above the inner ends of the notches between the teeth. When this position of the stem is attained, the sliding sleeve 12 is forced down toward the enlargement 11, until the lower end of the sliding or locking sleeve engages the upper end of the enlargement, and both saw and bearing sleeve 8 are thus tightly locked or keyed in place in the spindle.

The lower end of the sleeve 12 fits within the upper end of the saw, and the upper end of the saw is thus held throughout the extent of its engagement with the spindle in close contact with the interior of the bore 7, and is firmly braced in place.

The saws in question are those used for cutting buttons, and in practice, with the ordinary form of mounting, it is a difficult task to properly key a saw in the spindle, especially after the upper end of the saw is in the spindle. The saw is frusto-conical or tapering, to fit the periphery of the sleeve 12, and the stem by the arrangement of the enlargement 11 forms a firm brace and reinforcement for the lower end of the saw. With the improvement the saw may be firmly keyed in place, regardless of its length.

It will be noted that the key arranged in the split and having its edges in contact with the edges of the split, has also its sides flush with the inner and outer walls of the tool.

We claim:

1. In combination with a spindle having a tapering bore, a saw fitting the bore at one end, the saw being in the form of a split sleeve, of a split sleeve fitting the upper end of the spindle and spaced apart from the saw at the adjacent edges, said sleeve being frusto-conical or tapering to fit the bore of the spindle, a wedge between the side edges of the splits of the saw and sleeve, and a stem having at the end adjacent the saw a cylindrical enlargement fitting within the saw and adapted to extend from the teeth to and within the adjacent end of the spindle, said stem having a head at its opposite end, and beyond the adjacent end of the sleeve, and a tapering locking sleeve mounted to slide on the stem between the head and the enlargement for keying the saw and the sleeve in place in the spindle.

2. A saw keying attachment comprising in combination with a spindle having a tapering bore, a saw in the form of a split sleeve fitting the bore at one end, and a stem having an enlargement fitting within the saw, of a split tapering sleeve fitting within the other end of the spindle, and spaced from the saw, a tapering locking sleeve mounted to slide on the stem toward and from the enlargement for keying the saw and the sleeve in place in the spindle, and a wedge engaging the registering splits of the sleeve and saw.

3. A saw keying attachment comprising in combination with a spindle having a tapering bore, a saw in the form of a split sleeve fitting the bore at one end and a stem having an enlargement fitting within the saw, of a split tapering sleeve fitting within the other end of the spindle, and spaced from the saw, and a tapering locking sleeve mounted to slide on the stem toward and from the enlargement for keying the saw and the sleeve in place in the spindle.

4. An attachment for keying saws in the form of split sleeves into hollow spindles, comprising in combination with a spindle for receiving the saws and a stem having an enlargement fitting within the saw, of a tapering sleeve mounted to slide on the stem toward and from the enlargement and adapted to engage within the inner end of the saw to key the same to the spindle.

5. A member having a bore, a cylindrical tool disposed within the bore and formed with a longitudinal split, a key arranged in the split and having its edges in contact with the edges thereof and its sides flush with the inner and outer walls of the tool, and a locking member disposed within the tool and clamping it and the key within the bore.

6. A member having a bore, a longitudinally split cylindrical tool disposed within an end portion of the bore, a longitudinally split cylindrical member arranged in the opposite end portion of the bore, a key located in the splits of the tool and member, and a locking member within the tool and cylindrical member for clamping them and the key in the bore.

ALONZO C. BUTTMAN.
FRANK P. GABLE.

Witnesses:
THOMAS T. THORP,
SAMUEL H. McGILL.

Copies of this patent may be obtained for five cents each, by addressing the "Commissioner of Patents, Washington, D. C."